United States Patent
Sethumadhavan et al.

(10) Patent No.: US 10,108,033 B2
(45) Date of Patent: Oct. 23, 2018

(54) SUBASSEMBLIES COMPRISING A COMPRESSIBLE PRESSURE PAD, METHODS FOR REDUCING RIPPLE EFFECT IN A DISPLAY DEVICE, AND METHODS FOR IMPROVING IMPACT ABSORPTION IN A DISPLAY DEVICE

(71) Applicant: Rogers Corporation, Rogers, CT (US)

(72) Inventors: Murali Sethumadhavan, Acton, MA (US); Trevor Polidore, Rexford, NY (US)

(73) Assignee: ROGERS CORPORATION, Rogers, CT (US)

( * ) Notice: Subject to any disclaimer, the term of this patent is extended or adjusted under 35 U.S.C. 154(b) by 62 days.

(21) Appl. No.: 15/222,395

(22) Filed: Jul. 28, 2016

(65) Prior Publication Data

US 2017/0038616 A1    Feb. 9, 2017

Related U.S. Application Data

(60) Provisional application No. 62/245,505, filed on Oct. 23, 2015, provisional application No. 62/200,887, filed on Aug. 4, 2015.

(51) Int. Cl.
*G02F 1/1333*    (2006.01)
*B32B 5/02*    (2006.01)
*B32B 7/12*    (2006.01)

(52) U.S. Cl.
CPC ............ *G02F 1/1333* (2013.01); *B32B 5/022* (2013.01); *B32B 7/12* (2013.01);
(Continued)

(58) Field of Classification Search
CPC ............. G02F 1/1333; G02F 1/133305; G02F 1/133308; G02F 2001/133311;
(Continued)

(56) References Cited

U.S. PATENT DOCUMENTS

| 3,388,194 A | 6/1968 | Vinicki |
| 3,825,380 A | 7/1974 | Harding et al. |

(Continued)

FOREIGN PATENT DOCUMENTS

EP    2019875 B1    6/2013

OTHER PUBLICATIONS

International Search Report for International Application PCT/US2016/044628; International filing date Jul. 29, 2016; dated Nov. 3, 2016; 6 pages.

(Continued)

*Primary Examiner* — Nathanael R Briggs
(74) *Attorney, Agent, or Firm* — Cantor Colburn LLP

(57) ABSTRACT

A subassembly for a display device includes a display component having an outer display surface and an opposite inner surface; a compressible pressure pad including a plurality of nonwoven fibers having an average diameter of 100 micrometers or less, disposed on the inner surface of the display component; and an internal component disposed on a side of the compressible pressure pad on a side opposite the display component. Methods for reducing ripple effect and improving impact absorption in a display device are also described.

17 Claims, 3 Drawing Sheets

(52) U.S. Cl.
CPC .. *G02F 1/133305* (2013.01); *G02F 1/133308* (2013.01); *B32B 2307/54* (2013.01); *B32B 2307/558* (2013.01); *B32B 2457/202* (2013.01); *G02F 2001/133311* (2013.01); *G02F 2201/503* (2013.01); *G02F 2201/505* (2013.01); *G02F 2202/022* (2013.01)

(58) Field of Classification Search
CPC ......... G02F 2201/503; G02F 2201/505; G02F 2202/022; B32B 5/022; B32B 7/12; B32B 2307/54; B32B 2307/558; B32B 2457/202

See application file for complete search history.

(56) References Cited

U.S. PATENT DOCUMENTS

| | | | |
|---|---|---|---|
| 4,536,361 A | 8/1985 | Torobin | |
| 4,790,736 A | 12/1988 | Keuchel | |
| 5,183,670 A | 2/1993 | Trudeau | |
| 5,290,626 A | 3/1994 | Nishio et al. | |
| 5,935,883 A | 8/1999 | Pike | |
| 6,110,588 A | 8/2000 | Perez et al. | |
| 6,315,806 B1 | 11/2001 | Torobin et al. | |
| 6,382,526 B1 | 5/2002 | Reneker et al. | |
| 6,520,425 B1 | 2/2003 | Reneker | |
| 7,501,085 B2 | 3/2009 | Bodaghi et al. | |
| 7,575,707 B2 | 8/2009 | Xia et al. | |
| 7,786,034 B2 | 8/2010 | Armantrout et al. | |
| 7,815,427 B2 | 10/2010 | Green et al. | |
| 8,066,932 B2 | 11/2011 | Xu | |
| 8,178,030 B2 | 5/2012 | Anneaux et al. | |
| 8,277,711 B2 | 10/2012 | Huang et al. | |
| 8,395,016 B2 | 3/2013 | Isele et al. | |
| 8,518,320 B2 | 8/2013 | Steckl et al. | |
| 8,608,817 B2 | 12/2013 | Wertz et al. | |
| 8,647,540 B2 | 2/2014 | Peno et al. | |
| 8,647,541 B2 | 2/2014 | Peno et al. | |
| 8,658,067 B2 | 2/2014 | Peno et al. | |
| 8,709,309 B2 | 4/2014 | Peno et al. | |
| 8,721,319 B2 | 5/2014 | Lozano et al. | |
| 2010/0007942 A1* | 1/2010 | Oikawa | G02F 1/167 359/296 |

OTHER PUBLICATIONS

Written Opinion of the International Searching Authority for International Application PCT/US2016/044628; International filing date Jul. 29, 2016; dated Nov. 3, 2016; 6 pages.

International Preliminary Report on Patentability for International Application No. PCT/US2016/044628; International Filing date: Jul. 29, 2016; dated Nov. 6, 2017; 24 pages.

* cited by examiner

SUBASSEMBLIES COMPRISING A COMPRESSIBLE PRESSURE PAD, METHODS FOR REDUCING RIPPLE EFFECT IN A DISPLAY DEVICE, AND METHODS FOR IMPROVING IMPACT ABSORPTION IN A DISPLAY DEVICE

BACKGROUND

Advances in electronics have resulted in a trend of thin, flat display devices, including those using liquid crystal display (LCD) devices. LCD components are generally very fragile. The LCDs can be broken when a certain level of external impact is applied to the display. Additionally, devices featuring LCD and other types of display technology can suffer from a ripple effect when pressure is applied to the display, for example in a touch-based LCD device. It would be particularly desirable to provide an LCD device that exhibited a reduced ripple effect when pressure is applied to the display. Accordingly, there remains a continuing need in the art for display devices having improved impact properties, and in particular having a reduced ripple effect.

BRIEF DESCRIPTION

A subassembly for a display device comprises a display component comprising an outer display surface and an opposite inner surface; a compressible pressure pad comprising a plurality of nonwoven fibers having an average diameter of 100 micrometers or less, disposed on the inner surface of the display component; and an internal component disposed on a side of the compressible pressure pad on a side opposite the display component.

A display device comprising the above-described subassembly is also disclosed, wherein the display device is a mobile electronic device.

A subassembly for a mobile electronic display device comprises a liquid crystal display component or a light emitting diode display component having an outer display surface and an opposite inner surface, a screen disposed on the outer display surface of the display component; a compressible pressure pad disposed adjacent the inner surface of the display component, wherein the compressible pressure pad comprises a plurality of nonwoven, thermoplastic fibers having an average diameter of 100 micrometers or less a thickness of 50 micrometers to 1 millimeter, has a weight of 5 to 30 grams per square meter, and is devoid of a foam; and an internal component disposed on the compressible pressure pad on a side opposite the display component.

A mobile electronic display device comprises the subassembly, preferably wherein the mobile electronic display device is a cellular telephone, a smart telephone, a laptop computer, or a tablet computer.

A method for reducing ripple effect in a display device comprising a display component disposed on an internal component comprises incorporating a compressible pressure pad comprising a plurality of nonwoven fibers having an average diameter of 100 micrometers or less between the display component and the internal component.

A method for improving impact absorption in a display device comprising a display component disposed on an internal component comprises incorporating a compressible pressure pad comprising a plurality of nonwoven polymer fibers having an average diameter of 100 micrometers or less between the display component and the internal component; wherein the compressible pressure pad has a thickness of 250 micrometers or less, preferably 150 micrometers or less.

A nonwoven material comprises a plurality of nonwoven polymer fibers having an average diameter of 100 micrometers or less, and a thickness 250 micrometers or less, wherein the plurality of nonwoven polymer fibers comprise a thermoplastic elastomer having a tensile elongation of greater than 100%, measured according to ASTM D638; a resiliency of greater than 50%, preferably at least 60%, more preferably at least 65%, measured according to ASTM D4964; and a melt flow index of greater than 5 grams per 10 minutes, measured according to ASTM D1238 or ISO 1133; and wherein the nonwoven material exhibits an impact force reduction of greater than or equal to 4%, preferably greater than or equal to 10%.

The above described and other features are exemplified by the following Figures and Detailed Description.

BRIEF DESCRIPTION OF THE DRAWINGS

The following Figures are exemplary embodiments.

DETAILED DESCRIPTION

Described herein is a compressible pressure pad useful for a subassembly of a display device. Advantageously, the compressible pressure pad is capable of reducing or eliminating a ripple effect commonly observed when pressure is applied to a display, for example a liquid crystal display (LCD) or a light emitting diode (LED) display, particularly in mobile electronic devices. In another advantageous feature, the inventors hereof have unexpectedly discovered that a fibrous, nonwoven mat can be used as an impact absorbing layer in a display device to mitigate the ripple effect commonly observed upon applying pressure to a display, or to reinforce the screen of a display device. The use of a nonwoven mat, preferably in the absence of a foam, provides a high-performance, cost-effective solution for reinforcing the screen of a display device.

Figure 1:
FIG. 1 is a schematic illustration of an electronic device including the compressible pressure pad.

Accordingly, an aspect of the present disclosure is a display device subassembly 10 as shown generally in FIG. 1. Display device subassembly 10 is preferably an LCD. It is to be understood, however, that the pad can be used in other display devices where a pressure pad is useful. Subassembly 10 comprises a display component 12, also known in the art as a display package. The display component 12 has an outer display surface 14 and an opposite inner surface 16. A screen 18 can be disposed on the outer surface 14. As used herein, "disposed" means that two components can be in direct contact, or one or more intervening layers can be present. For example, an optically clear adhesive layer (not shown) can be present between the outer display surface 14 and screen 18.

A compressible pressure pad 20 is disposed on the inner surface 16. The compressible pressure pad is disposed between the inner surface 16 and an internal component 22 of the display device, for example a battery, heat sink, electronic component, display housing, or the like. In some embodiments, the compressible pressure pad 20 can be adhered to either or both the inner surface 16 of the display component 12 and the internal component 22, by one or more intervening adhesive layers, for example comprising an optically clear adhesive. In some embodiments, the device does not include an adhesive layer disposed on the compressible pressure pad.

The compressible pressure pad is elastic, in that it returns to its original thickness upon release of pressure, with good hysteresis with respect to its elasticity.

Further, the compressible pressure pad 20 comprises a plurality of nonwoven fibers having an average diameter of 100 micrometers or less, and is thus porous, i.e., comprises continuous voids that extend throughout the thickness of the pad. The nonwoven fibers can have an average diameter of 100 micrometers (um) or less, for example 0.5 nanometer (nm) to 100 um, or 0.5 nm to 80 um, or 1 nm to 50 um; or 0.5 nm to 10 um, or 10 nm to 8 um, or 100 nm to 5 um; or 250 nm to 5 um, or 500 nm to 5 um, or 750 nm to 5 um, or 1 um to 5 um. In some embodiments, the nonwoven fibers preferably have an average diameter of 5 micrometers or less. In some embodiments, the nonwoven fibers are microfibers having an average diameter of 1 to 10 um, or 1 to 5 um. In some embodiments the nonwoven fibers are nanofibers having an average diameter of 0.5 to 900 nm, or 10 to 800, or 200 to 700 nm, or 1 to 100 nm, or 1 to 50 nm, or 10 to 50 nm.

The nonwoven fibers can have cross-sections with various regular and irregular shapes including, but not limiting to circular, oval, square, rectangular, triangular, diamond, trapezoidal and polygonal. The number of sides of the polygonal cross-section can vary from 3 to 16. In some embodiments, the fibers preferably have a cross-section that is circular or substantially circular.

The nonwoven fibers can be in the form of a fibrous mat comprising the plurality of nonwoven fibers. The compressible pressure pad can have an average pore (void) diameter between fibers of 0.05 nm to 50 millimeters (mm), or 0.1 nm to 1 mm, or 1 nm to 500 um. In some embodiments the pores or voids can have an average diameter of 0.05 to 900 nm, or 0.1 to 800 nm, or 1 to 800 nm, or 10 to 700 nm, or 200 to 700 nm. In some embodiments, the pores or voids can have an average diameter of 1 um to 50 mm, or 5 um to 1000 um, or 10 to 800 um, or 10 to 500 um, or 100 to 900 um, or 200 to 700 um.

The compressible pressure pad can have a thickness of 10 um to 10 mm, or 50 um to 5 mm, or 50 um to 2 mm, or 50 um to 1 mm, or 50 to 500 um, or 50 to 250 um. In some embodiments, the compressible pressure pad preferably has a thickness of 250 micrometers or less, or 10 to 200 micrometers, or 25 to 200 micrometers, or 50 to 200 micrometers.

The compressible pressure pad can have a weight of 1 to 100 grams per square meter, or 2.5 to 50 grams per square meter, or 5 to 30 grams per square meter.

The compressible pressure pad comprises a plurality of nonwoven fibers comprising a thermoplastic polymer. As used herein, the term "thermoplastic" refers to a material that is plastic or deformable, melts to a liquid when heated, and freezes to a brittle, glassy state when cooled sufficiently. Thermoplastics are typically high molecular weight polymers. Examples of thermoplastic polymers that can be used include polyacetals (e.g., polyoxyethylene and polyoxymethylene), poly($C_{1-6}$ alkyl)acrylates, polyacrylamides, polyamides, (e.g., aliphatic polyamides, polyphthalamides, and polyaramides), polyamideimides, polyanhydrides, polyarylates, polyarylene ethers (e.g., polyphenylene ethers), polyarylene sulfides (e.g., polyphenylene sulfides), polyarylsulfones, polybenzothiazoles, polybenzoxazoles, polybenzimidazoles, polycarbonates (including polycarbonate copolymers such as polycarbonate-siloxanes, polycarbonate-esters, and polycarbonate-ester-siloxanes), polyesters (e.g., polyethylene terephthalates, polybutylene terephthalates, polyarylates, and polyester copolymers such as polyester-ethers), polyetheretherketones, polyetherimides (including copolymers such as polyetherimide-siloxane copolymers), polyetherketoneketones, polyetherketones, polyethersulfones, polyimides (including copolymers such as polyimide-siloxane copolymers), poly($C_{1-6}$ alkyl)methacrylates, polymethacrylamides, polynorbornenes (including copolymers containing norbornenyl units) polyolefins (e.g., polyethylenes, polypropylenes, polytetrafluoroethylenes, and their copolymers, for example ethylene-alpha-olefin copolymers), polyoxadiazoles, polyoxymethylene, polyphthalides, polysilazanes, polysiloxanes, polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, polyvinyl alcohols, polyvinyl esters, polyvinyl ethers, polyvinyl halides, polyvinyl nitriles, polyvinyl ketones, polyvinyl thioethers, polyvinylidene fluorides, or the like, or a combination comprising at least one of the foregoing thermoplastic polymers. Polyacetals, polyamides (nylons), polycarbonates, polyesters, polyetherimide, polyolefins, and polystyrene copolymers such as ABS, are especially useful in a wide variety of articles, have good processability, and are recyclable.

Useful polyamides include, but are not limited to, synthetic linear polyamides, e.g., Nylon-6,6; Nylon-6,9; Nylon-6,10; Nylon-6,12; Nylon-11; Nylon-12 and Nylon-4,6, preferably Nylon 6 and Nylon 6,6, or a combination comprising at least one of the foregoing. Polyurethanes that can be used include aliphatic, cycloaliphatic, aromatic, and polycyclic polyurethanes, including those described above. Also useful are polyacrylates and polymethacrylates, which include, for example, polymers and copolymers of one or more of acrylic acid, methyl acrylate, ethyl acrylate, acrylamide, methacrylic acid, methyl methacrylate, n-butyl acrylate, and ethyl acrylate, to name a few.

Representative examples of polyolefins as thermoplastic polymers are polyethylene, polypropylene, polybutylene, polymethylpentene (and co-polymers thereof), polynorbornene (and co-polymers thereof), poly(l-butene), poly(3-methylbutene), poly(4-methylpentene) and copolymers of ethylene with propylene, 1-butene, 1-hexene, 1-octene, 1-decene, 4-methyl-1-pentene and 1-octadecene. Representative combinations of polyolefins are combinations containing polyethylene and polypropylene, low-density polyethylene and high-density polyethylene, and polyethylene and olefin copolymers containing copolymerizable monomers, some of which are described above, e.g., ethylene and acrylic acid copolymers; ethyl and methyl acrylate copolymers; ethylene and ethyl acrylate copolymers; ethylene and vinyl acetate copolymers-, ethylene, acrylic acid, and ethyl acrylate copolymers, and ethylene, acrylic acid, and vinyl acetate copolymers. In some embodiments, the thermoplastic polymer can include a polyolefin elastomer.

A thermoplastic elastomer (TPE) can be used, which is sometimes referred to as a thermoplastic rubber. TPEs can be copolymers or a physical mix of polymers including a rubber. Examples of TPEs that can be used include styrenic block copolymers (TPE-s), certain polyolefins and polyolefin blends (TPE-o), elastomeric alloys (TPE-v or TPV), thermoplastic polyurethanes (TPU), certain copolyesters, and certain polyamides. In some embodiments, a combination of the TPEs, for example a blend of polyolefins, can be used in order to obtain the desired properties, including processability to form the nonwoven web, elasticity, chemical resistance, and the like.

In some embodiments, the thermoplastic polymer is a thermoplastic polyester elastomer (TPEE) comprising a poly(ether-ester) block copolymer. Poly(ether-ester) block copolymers consist essentially of "soft block" long-chain ester units of formula (1)

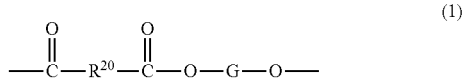

(1)

wherein G is a derived from a poly($C_1$-$C_4$ alkylene oxide) glycol having a number-average molecular weight of 400 to 6000, and $R^{20}$ is derived from a $C_4$-$C_{24}$ aliphatic or aromatic dicarboxylic acid, preferably an aromatic dicarboxylic acid; and "hard block" short-chain ester units of formula (2)

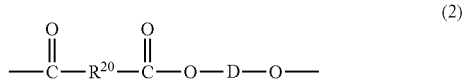

(2)

wherein D is a $C_1$-$C_{10}$ alkylene or cycloalkylene derived from the corresponding diol having a molecular weight of less than or equal to 300; and $R^{20}$ is derived from a $C_8$-$C_{24}$ alicyclic or aromatic dicarboxylic acid, preferably an aromatic dicarboxylic acid; with the proviso that the short-chain ester units constitute about 40% to about 90% by weight of the poly(ether-ester) block copolymer, and the long-chain ester units constitute about 10% to about 60% by weight of the poly(ether-ester) block copolymer.

In some embodiments, the hard segment of the thermoplastic polyester elastomer comprises a poly(alkylene terephthalate), a poly(alkylene isophthalate), 1,4-cyclohexane-dimethanol-1,4-cyclohexane dicarboxylate, or a combination comprising at least one of the foregoing. In some embodiments, the soft segment of the thermoplastic polyester elastomer comprises a polyether comprising a polybutylene ether, a polypropylene ether, a polyethylene ether, a polytetrahydrofuran, or a combination comprising at least one of the foregoing. In some embodiments, the soft segment of the thermoplastic polyester elastomer comprises a polybutylene ether.

A variety of poly(ether-ester) copolymers are commercially available, for example under the trademarks ARNITEL EM400 and ARNITEL EL630 poly(ether-ester) copolymers from DSM; HYTREL 3078, HYTREL 4056, HYTREL 4556, and HYTREL 6356 poly(ether-ester) copolymers from DuPont; and ECDEL 9966 poly(ether-ester) copolymer from Eastman Chemical. In all cases, the soft block is derived from tetrahydrofuran. In the HYTREL 4556, HYTREL 6356, ARNITEL EM400, and ARNITEL EL630 poly(ether-ester) copolymers, the hard block is based on poly(butylene terephthalate) (PBT). In the HYTREL 4056 poly(ester-ether) copolymer, the hard block contains isophthalate units in addition to terephthalate units. In the ECDEL 9966 poly(ether-ester) copolymer, the hard block is based on poly(1,4-cyclohexane-dimethanol-1,4-cyclohexane dicarboxylate) (PCCD) units.

In other embodiments, the TPE is a polyolefin or polyolefin blend, for example polypropylene.

In some embodiments, the thermoplastic polymer has a tensile elongation at break of greater than 100%, preferably greater than 150%, more preferably greater than 300%, measured according to ASTM D638. In some embodiments, the thermoplastic elastomer has a resiliency of greater than 50%, preferably at least 60%, more preferably at least 65%, measured according to ASTM D4964. In some embodiments, the thermoplastic polymer can have a melt flow index that is effective to allow melt blowing of the thermoplastic polymer to form the plurality of polymer fibers. For example, the thermoplastic polymer can have a melt flow index of greater than 5 grams per 10 minutes, measured according to ASTM D1238 or ISO 1133. In some embodiments, the nonwoven fibers comprise a thermoplastic polymer or combination of thermoplastic polymers effective to provide all the above described properties.

In some embodiments, the plurality of nonwoven fibers can exclude glass (i.e., no glass is intentionally added to the nonwoven fibers).

The thermoplastic polymers can be combined with conventional additives such as antiblocking agents, antioxidants, anti-static agents, colorants such as dyes or pigments, coupling agents such as silanes, titanates, or zirconates, heat stabilizers, light stabilizers, lubricants, opacifying agents, process aids, surfactants, tackifiers, wetting agents, or flame retardants to provide a thermoplastic composition for the manufacture of the nonwoven fibers. These additives can be blended or otherwise admixed with the thermoplastic polymers, and each can be present in an amount of 0.01 to 10 weight percent based on the weight of the thermoplastic polymer.

As light stabilizers, sterically hindered amines can be used, for example, bis(2,2,6,6-tetramethylpiperidyl)-sebacate, bis-(1,2,2,6,6-pentamethylpiperidyl)-sebacate, n-butyl-3,5-di-tert-butyl-4-hydroxybenzyl malonic acid bis(1,2,2,6,6-pentamethylpiperidyl) ester, condensation product of 1-hydroxyethyl-2,2,6,6-tetramethyl-4-hydroxy-piperidine and succinic acid, condensation product of N,N'-(2,2,6,6-tetramethylpiperidyl)-hexamethylendiamine and 4-tert-octylamino-2,6-dichloro-1,3,5-s-triazine, tris-(2,2,6,6-tetramethylpiperidyl)-nitrilotriacetate, tetrakis-(2,2,6,6-tetramethyl-4-piperidyl)-1,2,3,4-butane-tetra-carbonic acid, 1,1'(1,2-ethanediyl)-bis-(3,3,5,5-tetramethylpiperazinone). Such amines include hydroxylamines derived from hindered amines, such as di(1-hydroxy-2,2,6,6-tetramethylpiperidin-4-yl)sebacate: 1-hydroxy 2,2,6,6-tetramethyl-4-benzoxypiperidine; 1-hydroxy-2,2,6,6-tetramethyl-4-(3,5-di-tert-butyl-4-hydroxy hydrocinnamoyloxy)-piperdine; and N-(1-hydroxy-2,2,6,6-tetramethyl-piperidin-4-yl)-epsiloncaprolactam. Light stabilizers are typically present in amounts from 0 to 3.0 wt %, preferably 0.001-2.0 wt %, based on the total weight of the thermoplastic polymer.

Exemplary antioxidants include primary antioxidants, free radical scavengers, and metal deactivators. A non-limiting example of a free radical scavenger is poly[[6-(1,1,3,3-tetramethylbutyl)amino-s-triazine-2,4-dyil][(2,2,6,6,-tetramethyl-4-piperidyl)imino]hexamethylene[(2,2,6,6- tetramethyl-4-piperidyl)imino]], commercially available from BASF (formerly Ciba Chemicals) under the trade name Chimassorb 944.

Primary antioxidants include the following: (i) Alkylated monophenols, for example: 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2,6-bis([alpha]-methylbenzyl)-4-methylphenol 2-([alpha]-methylcyclohexyl)-4,6-dimethylphenol, 2,6-dioctadecyl-4-methylphenol, 2,4,6,-tricyclohexyphenol, and 2,6-di-tert-butyl-4-methoxymethylphenol; (ii) alkylated hydroquinones, for example, 2,6-di-tert-butyl-4-methoxyphenol, 2,5-di-tert-butyl-hydroquinone, 2,5-di-tert-amyl-hydroquinone, and 2,6-diphenyl-4-octadecyloxyphenol; (iii) hydroxylated thiodiphenyl ethers, for example, 2,2'-thio-bis-(6-tert-butyl-4-methylphenol), 2,2'-thio-bis-(4-octylphenol), 4,4'-thio-bis-(6-tert-butyl-3-methylphenol), and 4,4'-thio-bis (6-tert-butyl-2-methyphenol); (iv) alkylidene-bisphenols, for example, 2,2'-methylene-bis-(6-tert-butyl-4-methylphenol), 2,2'-methylene-bis-(6-tert-butyl-4-ethylphenol), 2,2'-methylene-bis-(4-methyl-6-([alpha]-methylcyclohexyl)phenol), 2,2'-methylene-bis-(4-methyl-6-cyclohexylphenol), 2,2'-methylene-bis-(6-nonyl-4-methylphenol), 2,2'-methylene-bis-(6-nonyl-4-methylphenol), 2,2'-methylene-bis-(6-[alpha]methylbenzyl)-4-nonylphenol, 2,2'-methylene-bis-(6-(alpha,alpha-dimethylbenzyl)-4-nonyl-phenol), 2,2'-methylene-bis-(4,6-di-tert-butylphenol), 2,2'-ethylidene-bis-(6-tert-butyl-4-isobutylphenol), 4,4'-methylene-bis-(2,6-di-tert-butylphenol), 4,4'-methylene-bis-(6-tert-butyl-2-methylphenol), 1,1-bis-(5-tert-butyl-4-hydroxy-2-methylphenol)butane, 1,1-bis(2-methyl-4-hydroxy-5-tert-butylphenyl)butane, 2,2'-isobutylidene-bis(4,6-dimethylphenol), 2,6-di-(3-tert-butyl-5-methyl-2-hydroxybenzyl)4-methylphenol, 1,1,3-tris-(5-tert-butyl-4-hydroxy-2-methylphenyl)butane, 1,1-bis-(5-tert-butyl-4-hydroxy-2-methylphenyl)-3-dodecyl-mercaptobutane, ethyleneglycol-bis-(3,3,-bis-(3'-tert-butyl-4'-hydroxyphenyl)-butyrate)-di-(3-tert-butyl-4-hydroxy-5-methylphenyl)-dicyclopentadiene, and di-(2-(3'tert-butyl-2'hydroxy-5'methyl-benzyl)-6-tert-butyl-4-methylphenypterephthalate (v) benzyl compounds, for example, 1,3,5-tris-(3,5-di-tert-butyl-4-hydroxybenzyl)-2,4,6-trimethylbenzene, bis-(3,5-di-tert-butyl-4-hydroxybenzyl)sulfide, isooctyl 3,5-di-tert-butyl-4-hydroxybenzyl-mercapto-acetate, bis-(4-tert-butyl-3-hydroxy-2,6-dimethylbenzyl)dithiol-terephthalate, 1,3,5-tris-(3,5-di-tert-butyl-4 hydroxybenzypisocyanurate, 1,3,5-tris-(4-tert-butyl-3-hydroxy-2,6-dimethylbenzyl) isocyanurate, 1,3,5-tris(4-t-butyl-3-hydroxy-2,6-dimethylbenzyl)-1,3,5-Triazine-2,4,6-(1H,3H,5H)-trione, dioctadecyl-3,5-di-tert-butyl-4-hydroxybenzyl-phosphonate, calcium salt of monoethyl 3,5-di-tert-butyl-4-hydroxybenzylphosphonate, 1,3,5-tris-(3,5-dicyclohexyl-4-hydroxybenzyl)isocyanurate; (vi) acylaminophenols, for example, 4-hydroxylauric acid anilide, 4-hydroxy-stearic acid anilide, 2,4-bis-octylmercapto-6-(3,5-tert-butyl-4-hydroxyanilino)-s-triazine, and octyl-N-(3,5-di-tert-butyl-4-hydroxyphenyl)-carbamate; (vii) esters of beta-(3,5-di-tert-butyl-4-hydroxyphenol)-propionic acid with monohydric or polyhydric alcohols, for example, methanol, dimethylene glycol, octadecanol, trimethylene glycol, 1,6-hexanediol, pentaerythritol, neopentylglycol, tris-hydroxyethylisocyanurate, thiodiethyleneglycol, di-hydroxyethyl oxalic acid diamide. Such phenols also include tetrakis [methylene{3, 5-di-tert-butyl-4-hydroxycinnamate}]methane; (viii) thio esters of beta-(5-tert-butyl-4-hydroxy-3-methylphenyl)-propionic acid with monohydric or polyhydric alcohols, for example, methanol, dimethylene glycol, octadecanol, trimethylene glycol, 1,6-hexanediol, pentaerythritol, neopentylglycol, tris-hydroxyethyl isocyanurate, thiodiethyleneglycol, dihydroxyethyl oxalic acid diamide; (ix) amides of beta-(3,5-di-tert-butyl-4-hydroxyphenol)-propionic acid for example, N,N'-di-(3,5-di-tert-butyl-4-hydroxyphenylpropionyl)-hexammethylen-diamine, N,N'-di-(3,5-di-tert-butyl-4-hydroxyphenylpropionyl)trimethylenediamine, N,N'-di-(3,5-di-tert-butyl-4-hydroxypropionyl)hydrazine, N,N'-hexamethylene bis[3-(3,5-di-t-butyl-4-hydroxyphenyl) propionamide, and 1,2-Bis(3,5-di-tert-butyl-4-hydroxyhydrocinnamoyl)hydrazine; (x) other phenolic antioxidants include polymeric phenols such as the reaction product of 4-methylphenol with dicyclopentadiene and isobutylene, alkylidene-poly-phenols, such as 1,3 tris(3-methyl-4-hydroxyl-5-t-butyl-phenyl)-butane; thio phenols such as 2,6-di-tert-butyl-4-(4,6-bis(octylthio)-1,3,5-triazin-2-ylamino) phenol, 4,6-bis (octylthiomethyl)-o-cresol; 4,6-bis(dodecylthiomethyl)-o-cresol, ester phenols include bis [3,3-bis(4-hydroxy-3-tert-butyl phenyl)butanoic acid]glycol ester and 2-[1-(2-hydroxy-3,5-di-tert-pentylphenyl) ethyl]-4,6-di-tert-pentylphenyl acrylate; and (xi) other primary antioxidants include hydroxyl amines and N-oxides such as bis(octadecyl)hydroxylamine.

A non-limiting example of a metal deactivator is 2,2-oxalyldiamido bis[ethyl 3-(3,5-di-t-butyl-4-hydroxyphenyl) propionate] commercially available from Chemtura (Middlebury, Conn.) under the trade name NAUGUARD XL-1. A single antioxidant or a combination comprising at least one of the foregoing antioxidants can be used. An antioxidant can be present in amounts of up to 3 wt %, specifically 0.5 to 2.0 wt %, based on the total weight of the thermoplastic polymer.

The nonwoven fibers can be prepared by any method that is generally known in the art. For example, nonwoven fibers can be manufactured using a solution spinning method or a melt spinning method. In both the melt and solution spinning methods, a material can be put into a fiber producing device which is spun at various speeds until fibers of appropriate dimensions are made. The material can be formed, for example, by melting a solute or can be a solution formed by dissolving a mixture of a solute and a solvent. Any solution or melt familiar to those of ordinary skill in the art can be employed. For solution spinning, a material can be designed to achieve a desired viscosity, or a surfactant can be added to improve flow, or a plasticizer can be added to soften a rigid fiber. In melt spinning, solid particles can comprise, for example, a metal or a polymer, wherein polymer additives can be combined with the latter.

In some embodiments, the fibers can be formed by centrifugal spinning. In a preferred embodiment, the fibrous mat includes a plurality of centrifugally spun fibers. In other embodiments still, the fibrous mat includes a plurality of centrifugally spun fibers formed from a thermoplastic polymer.

Centrifugal spinning can produce microfibers and nanofibers from a wide range of materials. As known to those skilled in the art, centrifugal spinning employs centrifugal force, rather than an electrostatic force, to spin fibers. In centrifugal spinning, either solutions or solid materials can be solution-spun or melt-spun into fibers. Key parameters to control the geometry and morphology of the fibers include rotational speed of the spinneret, collection system, and temperature. Orifices of the spinneret can have arbitrary geometric shapes to provide corresponding cross-sections of fibers. In a preferred embodiment, centrifugal spinning produces microfibers or nanofibers, preferably nanofibers.

Centrifugal spinning is described, for example, in U.S. Pat. Nos. 3,388,194; 4,790,736; 7,786,034; 8,647,540; 8,647,541; 8,658,067; 8,709,309; and U.S. Pat. No. 8,721,319. Nanofiber mats are available via Forcespinning™, a tradename of the FibeRio Technology Corporation (McAllen, Tex.).

In either the solution or melt centrifugal spinning method, as the material is ejected from the spinning fiber producing device, thin jets of the material are simultaneously stretched and dried or stretched and cooled in the surrounding environment. Interactions between the material and the environment at a high strain rate (due to stretching) lead to solidification of the material into fibers, which can be accompanied by evaporation of solvent. Non-limiting examples of solvents that can be used include oils, lipids, and organic solvents such as DMSO, toluene and alcohols. Water, such as de-ionized water, can also be used as a solvent. By manipulating the temperature and strain rate, the viscosity of the material can be controlled to manipulate the size and morphology of the fibers that are created. Non-limiting examples of fibers made using the melt centrifugal spinning method include polypropylene, acrylonitrile butadiene styrene (ABS) and nylon fibers. Non-limiting examples of fibers made using the solution centrifugal spinning method include polyethylene oxide (PEO) and beta-lactam fibers.

Methods of producing fibers also include a class of methods described by melt fibrillation. Melt fibrillation is a general class of making fibers defined in that one or more polymers are molten and extruded into many possible configurations, such as co-extrusion, homogeneous or bicomponent films or filaments, and then fibrillated or fiberized into fibers. Nonlimiting examples of melt fibrillation methods include melt blowing, melt film fibrillation, and melt fiber bursting. Methods of producing fibers, not from melts, are film fibrillation, electro-spinning, and solution spinning. Other methods of producing nanofibers include spinning a larger diameter bicomponent fiber in an islands-in-the-sea, segmented pie, or other configuration where the fiber is further processed after the fiber has solidified so that nanofibers result.

Melt blowing is a commonly used method of producing fibers. In melt-blowing, a thermoplastic polymer is typically stored in an extruder hopper in the form of beads, pellets, or chips. The extruder shaft or the screw forces the polymer from the feed hopper into the melting section. The polymer is then exposed to incrementally increasing temperatures in consecutive heating zones in the extruder. As the polymer passes through the extruder, the molten material is heated until it reaches the final desired melt-blowing temperature before being forced through the melt-blowing die. As the molten polymer emerges from the die through a row of orifices, the tip is attenuated by jets of high temperature; high velocity air forming fibers which are drawn down to very fine diameters. The fibers are then quenched and collected on a screen or moving belt to form a continuous web of nonwoven fabric containing nanofibers or microfibers. Examples of melt-blowing include U.S. Pat. Nos. 8,608,817; 8,395,016; 8,277,711; 7,501,085; 3,825,380, and EP2019875 B1.

Melt film fibrillation is another method to produce fibers. A melt film tube is produced from the melt and then a fluid is used to form nanofibers from the film tube. Examples of this method include U.S. Pat. Nos. 6,315,806; 5,183,670; 4,536,361; 6,382,526; 6,520,425, and 8,395,016. Although these methods are similar by first forming a melt film tube before the fibers result, the processes use different temperatures, flow rates, pressures, and equipment.

Film fibrillation is another method of producing fibers although not designed for the production of polymeric fibers to be used in nonwoven webs. U.S. Pat. No. 6,110,588 by Perez et al. describes of method of imparting fluid energy to a surface of a highly oriented, highly crystalline, melt-processed polymer film to form nanofibers. The films and fibers are useful for high strength applications such as reinforcement fibers for polymers or cast building materials such as concrete.

Electrospinning is a commonly used method of producing fibers. In this method, a polymer is dissolved in a solvent and placed in a chamber sealed at one end with a small opening in a necked down portion at the other end. A high voltage potential is then applied between the polymer solution and a collector near the open end of the chamber. The production rates of this process are very slow and fibers are typically produced in small quantities. Electrospinning is described, for example, in U.S. Pat. Nos. 8,178,030, 8,518,320, 8,066,932, 7,815,427; and U.S. Pat. No. 7,575,707. Another spinning technique for producing fibers is solution or flash spinning which utilizes a solvent.

Two-step methods of producing fibers are also known. A two-step method is defined as a method of forming fibers in which a second step occurs after the average temperature across the fiber is at a temperature significantly below the melting point temperature of the polymer contained in the fiber. Typically, the fibers will be solidified or mostly solidified. The first step is to spin a larger diameter multicomponent fiber in an islands-in-the-sea, segmented pie, or other configuration. The larger diameter multicomponent fiber is then split or the sea is dissolved so that nanofibers result in the second step. For example, U.S. Pat. No. 5,290,626 by Nishio et al., assigned to Chisso, and U.S. Pat. No. 5,935,883, by Pike et al., assigned to Kimberly-Clark, describe the islands-in-the-sea and segmented pie methods respectively. These processes involve two sequential steps, making the fibers and dividing the fibers.

The manufacture of fibers can be done in batch modes or in continuous modes. In the latter case, material can be fed continuously into the fiber producing device and the process can be continued over days (e.g., 1 to 7 days) and even weeks (e.g., 1 to 4 weeks).

In an embodiment, a method of manufacturing the fibers includes: heating a thermoplastic polymer; placing the material in a heated fiber producing device; and, after placing the heated material in the heated fiber producing device, rotating the fiber producing device to eject material to create nanofibers from the material. In some embodiments, the fibers can be microfibers or nanofibers. A heated fiber producing device is a structure that has a temperature that is greater than ambient temperature. "Heating a material" is defined as raising the temperature of that material to a temperature above ambient temperature. "Melting a material" is defined herein as raising the temperature of the material to a temperature greater than the melting point of the material, or, for polymeric materials, including thermoplastic polymers, raising the temperature above the glass transition temperature for the polymeric material. In alternate embodiments, the fiber producing device is not heated. Indeed, for any embodiment that employs a fiber producing device that can be heated, the fiber producing device can be used without heating. In some embodiments, the fiber producing device is heated but the material is not heated. The material becomes heated once placed in contact with the heated fiber producing device. In some embodiments, the material is heated and the fiber producing device is not heated. The fiber producing device becomes heated once it comes into contact with the heated material.

The spun fibers can then be collected. As used herein "collecting" of fibers refers to fibers coming to rest against a fiber collection device. After the fibers are collected, the fibers can be removed from a fiber collection device by a human or robot. A variety of methods and fiber (e.g., nanofiber) collection devices can be used to collect fibers. Regarding the fibers that are collected, in certain embodiments, at least some of the fibers that are collected are continuous or discontinuous, and are nonwoven.

In some embodiments, at least a portion of the fibers are crosslinked at a point of contact between the fibers. The crosslinking can occur during or after fiber manufacture. Crosslinking agents are typically used to effect crosslinking between polymer chains, and can be included in the thermoplastic polymer composition. Exemplary crosslinking agents include carbodiimides, isocyanates, compounds have more than one ethylenic unsaturation, and the like. In some embodiments the crosslinking agent is a monomer or oligomer comprising two or more vinyl groups that can be crosslinked by photoinitiation, for example polyfunctional ($C_{1-20}$ alkyl) (meth)acrylate esters such as ethylene glycol dimethacrylate, diethylene glycol di(meth)acrylate, triethylene glycol di(meth)acrylate, tetraethylene glycol di(meth)acrylate, 1,3-butylene glycol di(meth)acrylate, 1,4-butylene glycol di(meth)acrylate, 1,4-butanediol di(meth)acrylate, 1,6-hexanediol di(meth)acrylate, neopentyl glycol di(meth)acrylate, ethoxylated bisphenol A di(meth)acrylate, trimethylol propane tri(meth)acrylate, pentaerythritol tetra(meth)acrylate, and the like, a polymeric di(meth)acrylate such as polyethylene glycol di(meth)acrylate, and a combination comprising at least one of the foregoing. A crosslinking initiator, e.g., a photoinitiator, a crosslinking accelerator, or combination comprising at least one of the foregoing can be included in the thermoplastic composition. In some embodiments, the compressible pressure pad excludes a foam, or the compressible pressure pad is devoid of a foam, for example a polymer foam. For example, the compressible pressure pad can exclude a polyurethane foam.

The subassembly comprising the compressible pressure pad is particularly useful in various electronic display devices, for example in mobile electronic display devices. Exemplary mobile electronic devices that can include the subassembly comprising the compressible pressure pad include cellular telephone, smart telephone, laptop computers, tablet computers, and the like.

Thus, in a specific embodiment, a mobile electronic device comprises a screen component, and a display component (e.g., a liquid crystal display component, a light emitting diode component, an organic light emitting diode component, or the like) having an outer display surface and an opposite inner surface, wherein the screen is in contact with the outer display surface of the display component. A compressible pressure pad comprising a plurality of nonwoven fibers having an average diameter of 10 micrometers of less disposed on the inner surface of the display component, and an inner component of the display device. The nonwoven fibers comprise a thermoplastic polymer. Preferably, the thermoplastic polymer comprises a polyolefin (e.g., polypropylene), or a TPE such as a thermoplastic polyester elastomer. The compressible pressure pad can have a thickness of 50 micrometers to 1 millimeter, and a weight of 5 to 30 grams per square meter. The compressible pressure pad can be devoid of a foam, preferably a polymer foam.

A method for reducing the ripple effect in an electronic display device, preferably a liquid crystal display device or a light emitting diode device (e.g., an organic light emitting diode (OLED) device) is also provided. The method comprises incorporating a compressible pressure pad comprising a plurality of nonwoven fibers having an average diameter of 100 micrometers or less in the electronic display device. The compressible pressure pad can be as described above. The compressible pressure pad is incorporated between a display component and an inner component as described above.

The device can optionally include one or more intervening layers, for example an adhesive layer comprising an optically clear adhesive can be included between the display component and the compressible pressure pad.

In some embodiments, the article can include one or more intervening layers between the polymer foam composite and an internal component of an electronic device, for example an adhesive layer. In some embodiments, the adhesive layer can be a pressure sensitive adhesive. As used herein, a pressure sensitive adhesive (PSA) is one that adheres with as little as finger pressure. The adhesives can optionally be further cured, for example by exposure to ultraviolet light in the presence of a photoinitiator, e.g., certain radiation-curable acrylate/silicone PSAs. PSAs can include an adhesive elastomer as the primary base material and an optional tackifier. Examples of elastomers include a ($C_{1-6}$ alkyl) poly(meth)acrylate, including copolymers thereof with (meth)acrylic acid, polyvinyl alcohol, a polyvinyl acetate, a polyvinyl ether, a natural rubber such as a butyl rubber, a synthetic rubber such as a styrene block copolymer, a silicone, and a nitrile rubber. Examples of tackifiers include various terpene resins, aromatic resins, and hydrogenated hydrocarbon polymers. In some embodiments, the pressure sensitive adhesive preferably comprises a ($C_{1-6}$ alkyl) poly (meth)acrylate. Advantageously, an adhesive layer can be laminated to the compressible pressure pad (i.e., the nonwoven material) using lamination techniques and conditions that are generally known. In contrast, the use of a foamed material generally requires the use of a liner material, where the foam is cast onto the adhesive layer supported by the liner. Furthermore, since the foam is case prior to curing, selection of an adhesive material can be limited to those that can withstand curing conditions (e.g., curing temperatures).

Another embodiment is a method for improving impact absorption in a display device comprising a display component disposed on an internal component. The method comprises incorporating a compressible pressure pad comprising a plurality of nonwoven polymer fibers having an average diameter of 100 micrometers or less between the display component and the internal component; wherein the compressible pressure pad has a thickness of 200 micrometers or less, preferably 150 micrometers or less.

The nonwoven material described above represents another aspect of the present disclosure. The nonwoven material comprises a plurality of nonwoven polymer fibers having an average diameter of 100 micrometers of less, and has a thickness of 200 micrometers or less. The plurality of nonwoven fibers preferably comprise a thermoplastic polymer. In some embodiments the thermoplastic polymer has a tensile elongation of greater than 100%, measured according to ASTM D638, a resiliency of greater than 50%, preferably at least 60%, more preferably at least 65%, measured according to ASTM D4964, and a melt flow index of greater than 5 grams per 10 minutes, measured according to ASTM D1238 or ISO 1133. Advantageously, the above-described nonwoven material exhibits an impact force reduction of greater than or equal to 4%, preferably greater than or equal to 10%, compared to a surface not including the nonwoven material. Impact force reduction can be determined by a ball drop impact test, for example by dropping a 4.3 gram ball from a height of 30.5 centimeters above the sample. Determination of impact force reduction using a ball drop impact test is further described in the working examples below.

In some embodiments, the nonwoven materials can provide improved impact absorption when disposed on glass. For example, the nonwoven material disposed on a glass surface can exhibit at least one of an impact force reduction of at least 60%, preferably 60 to 95%, more preferably 65 to 90% compared to the glass surface not including the nonwoven material, determined by dropping a 10 gram steel ball from a height of 10 centimeters; an impact force reduction of at least 20%, preferably 20 to 50%, more preferably 25 to 45% compared to the glass surface not including the nonwoven material, determined by dropping a 30.6 gram steel ball from a height of 20 centimeters; and an impact force reduction of at least 30%, preferably 30 to 50% compared to the glass surface not including the nonwoven material, determined by dropping a 55 gram steel ball from a height of 20 centimeters. In some embodiments, the nonwoven material disposed on a glass surface can exhibit an impact force reduction of at least 20%, preferably 20 to 50%, more preferably 25 to 45%, even more preferably 30 to 45% compared to the glass surface not including nonwoven material, determined by dropping a 30.6 gram steel ball from a height of 20 centimeters.

In some embodiments, the nonwoven material can comprise single row or multi-row melt blown polymer fibers. Preferably, the nonwoven material includes multi-row melt blown polymer fibers. In some embodiments, the single row meltblown polymer fibers have an average diameter of 4 to 7 micrometers, preferably 5 to 7 micrometers, and the multi-row meltblown polymer fibers have an average diameter of 7 to 15 micrometers, preferably 10 to 15 micrometers. The diameter of the polymer fibers can be determined using scanning electron microscopy (SEM). In some embodiments, the plurality of nonwoven fibers are multi-row meltblown polymer fibers, and the nonwoven material exhibits at least one of an impact force reduction of at least 70%, preferably 70 to 95%, more preferably 75 to 90% compared to the glass surface not including the nonwoven material, determined by dropping a 10 gram steel ball from a height of 10 centimeters; and an impact force reduction of at least 30%, preferably 30 to 50%, more preferably 30 to 45% compared to the glass surface not including the nonwoven material, determined by dropping a 30.6 gram steel ball from a height of 20 centimeters.

In some embodiments, the nonwoven material has a thickness of 150 micrometers or less, the plurality of nonwoven fibers are multi-row melt blown polymer fibers, and the nonwoven material exhibits at least one of an impact force reduction of at least 80%, preferably 80 to 90% compared to the glass surface not including the nonwoven material, determined by dropping a 10 gram steel ball from a height of 10 centimeters; and an impact force reduction of at least 40%, preferably 40 to 50% compared to the glass surface not including the nonwoven material, determined by dropping a 30.6 gram steel ball from a height of 20 centimeters.

Another embodiment is an article comprising the above-described nonwoven material. As already described, the nonwoven material can be particularly useful in a subassembly for a display device. The article can be a back pad for a hand-held electronic device, a foam tape, or a gasket. The nonwoven materials described herein can also be particularly useful as backpads for various internal electronic components or camera lenses.

Provided herein are nonwoven materials having a desirable combination of properties that render them particularly useful for use as compressible pressure pads or back pads in a subassembly for a display device. Incorporating such materials into display devices or subassemblies for display devices can unexpectedly provide methods for reducing ripple effect or improving impact absorption in a display device.

EXAMPLES

Example 1

The following Examples demonstrate the results of an extended compression test for three compressible pressure pads prepared according to the present disclosure, and three foamed materials as comparative examples.

A compressible pressure pad was prepared by melt-blowing a thermoplastic poly(ether-ester) elastomer comprising butylene terephthalate units and tetramethylene ether glycol terephthalate units to form a plurality of fibers. The fibers were collected to form the nonwoven fibrous mat. The fibers had an average diameter of 3 micrometers, and the resulting pressure pad had a total thickness of 120 micrometers and a weight of 20 grams per square meter ("Hytrel 20 gsm"). An additional pressure pad having a basis weight of 30 grams per square meter was also prepared from this same material ("Hytrel 30 gsm"). A third pressure pad was prepared from meltblown Vistamaxx available from Exxon Mobil having a basis weight of 20 grams per square meter ("Vistamaxx 20 gsm").

The compression of the above compressible pressure pads was compared to two samples of an open-celled polyurethane foam (obtained as PORON Shockpad (79) from Rogers Corp.) having a density of 15 pounds per cubic foot (pcf) or 20 pcf, and a closed-cell polypropylene foam having a density of 2.5 pcf (obtained as Super Clean Foam SCF available from Nitto).

Figure 2:
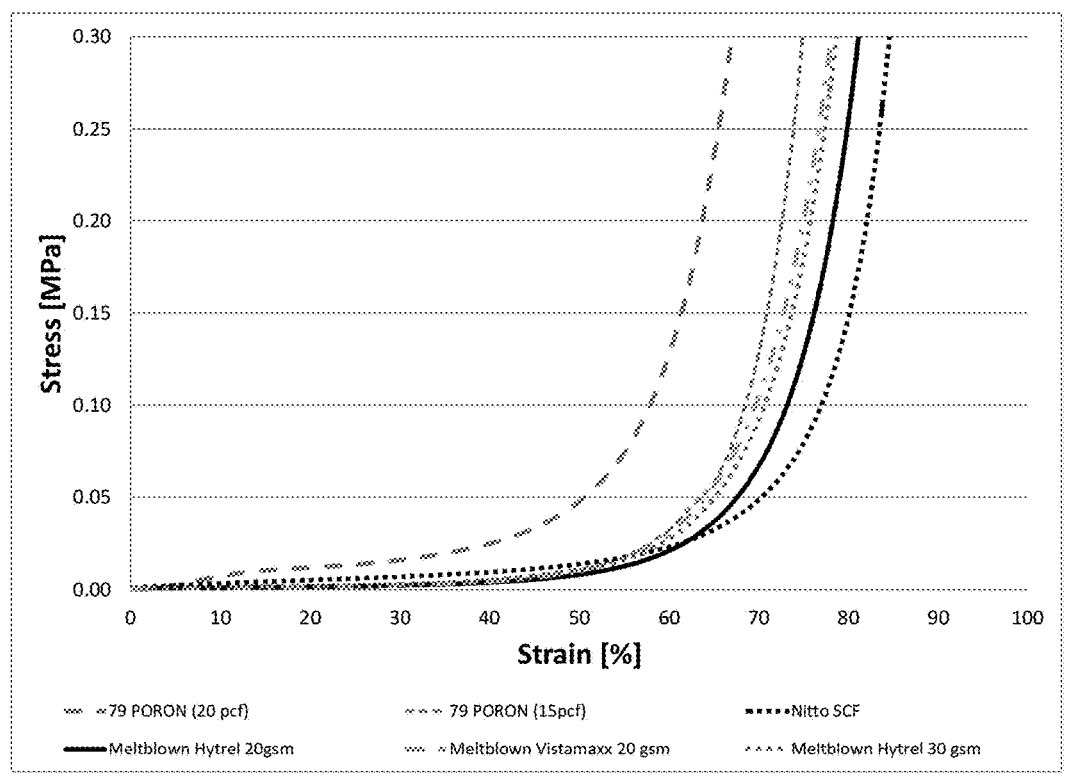
FIG. 2 shows the results of an extended compression test.

As shown in FIG. 2, the compressible pressure pads show compressibilities that are similar or better than those observed for the comparative foams. The nonwoven materials were observed to be more compressible for low strains (e.g., less than 50%), and more compressible than the polyurethane foams at higher strains. For example, the nonwoven materials were observed to be more compressible under less pressure than the foamed materials. The nonwoven prepared from the meltblown thermoplastic poly(ether-ester) elastomer having a weight of 20 gsm exhibited 60% strain under an applied stress of 0.023 MPa, the nonwoven prepared from the meltblown thermoplastic poly(ether-ester) elastomer having a weight of 30 gsm exhibited 60% strain under an applied stress of 0.035 MPa, and the nonwoven prepared from the meltblown Vistamaxx having a weight of 20 gsm exhibited 60% strain under an applied stress of 0.03 MPa. In contrast, an applied stress of about 0.13 MPa (20 pcf) and about 0.04 MPa (15 pcf) was required to compress the open-celled polyurethane foam to a strain of 60%, and an applied stress of about 0.025 MPa was required to compress the closed-cell polypropylene foam to 60% strain. The nonwoven materials were generally more compressible at low strain relative to the open-celled polyurethane foam, i.e., less pressure was required for the nonwovens to be compressed to a thickness in the low strain regime compared to the foamed materials. In the higher strain regime (i.e., greater than 50%), the nonwoven materials were more compressible than open-celled polyurethane foam.

Example 2

The nonwoven materials were tested for impact performance.

Impact testing was conducted using the pad materials according to the present disclosure and the results were compared to various foamed materials. The thickness of the materials was also varied. Each impact test was performed in triplicate, and the results were averaged to obtain the reported value. The results are reported as a percent reduction in the measured impact force ("reduction percent") by comparing the measured impact force for each material to a control drop that excluded the impact-absorbing material.

The various impact-absorbing materials tested are described in Table 1. While the thicknesses were varied from 0.1 to 0.25 millimeters, each material had a basis weight of 20 grams per square meter (gsm).

TABLE 1

| | |
|---|---|
| 1 | Multi-row meltblown nonwoven pad having a thickness of 0.25 mm prepared from a polyolefin elastomer obtained as Vistamaxx 7050FL available from Exxon Mobil and modified to reduce tack during meltblowing |
| 2* | Closed-cell polypropylene foam obtained as Super Clean Foam SCF 400 from Nitto, having a thickness of 0.23 mm |
| 3 | Single row meltblown nonwoven pad having a thickness of 0.2 mm prepared from a polyolefin elastomer obtained as Vistamaxx 7050FL available from Exxon Mobil and modified to reduce tack during meltblowing |
| 4* | Open-celled polyurethane foam having a thickness of 0.2 mm and a density of 20 pcf obtained as PORON Shockpad (79) foam available from Rogers Corporation |
| 5* | Open-celled polyurethane foam having a thickness of 0.2 mm and a density of 15 pcf obtained as PORON Shockpad (79) foam available from Rogers Corporation |
| 6* | Closed-cell polyolefin foam obtained as WL020 foam from Sekisui Chemical Co., having a thickness of 0.2 mm |
| 7* | Closed-cell polypropylene foam having a thickness of 0.15 mm obtained as Super Clean Foam SCF 400 available from Nitto |
| 8* | Open-celled polyurethane foam having a density of 20 pcf and thickness of 0.15 mm obtained as PORON Shockpad (79) foam available from Rogers Corporation |
| 9* | Open-celled polyurethane foam having a density of 15 pcf and a thickness of 0.15 mm obtained as PORON Shockpad (79) foam available from Rogers Corporation |
| 10* | Closed cell polyolefin foam obtained as WL015 foam from Sekisui Chemical Co., having a thickness of 0.15 mm |
| 11 | Single row meltblown nonwoven pad having a thickness of 0.15 mm comprising a thermoplastic polyester elastomer comprising a poly(ether-ester) |
| 12 | Multi-row meltblown nonwoven pad having a thickness of 0.15 mm comprising a thermoplastic polyester elastomer comprising a poly(ether-ester) |
| 13* | Open-celled polyurethane foam Corporation having a thickness of 0.1 mm obtained as PORON Shockpad (79) foam available from Rogers |

*Represents a comparative material

The nonwoven materials (1, 3, 11, and 12) were prepared as described above for the compression testing.

Figure 3:
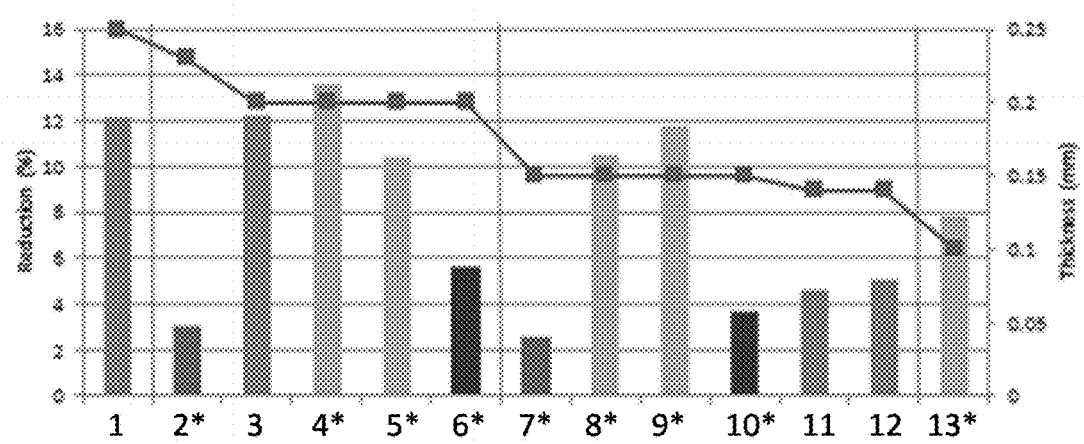
FIG. 3 shows the results of a ball drop impact test using a 4.3 gram steel ball dropped from a height of 30.5 centimeters.

To test the various impact-absorbing materials, standard low mass impact testing conditions were employed. A steel ball having a mass of 4.3 grams was dropped from a height of 30.5 centimeters above the sample. The impact force was recorded and compared to the impact force measured without the impact-absorbing material present to provide the force reduction as a percent. The results are shown in FIG. 3. As shown in FIG. 3, the shock pads including the nonwoven materials based on blends of a polyolefin elastomer and polypropylene (shown as 3) exhibited impact force reduction of about 12% at a thickness of 0.2 millimeters, outperforming both the closed-cell polypropylene foam (shown as 2*, exhibiting a force reduction of about 3%) and the closed-cell polyolefin foam obtained from Sekisui Chemical Co. (shown as 6*, exhibiting a force reduction of about 5.5%) at comparable thicknesses. Thinner nonwoven materials having a thickness of 0.15 millimeters prepared from the thermoplastic polyester elastomer (shown as 11 and 12) each exhibited force reductions of 4 to 5%, and similarly outperformed the closed-cell polypropylene foam (shown as 7*, exhibiting a force reduction of about 2.5%) and the closed-cell polyolefin foam obtained from Sekisui Chemical Co. (shown as 10*, exhibiting a force reduction of about 3.5%) at comparable thicknesses.

The impact reduction of the above materials was further characterized in the presence of glass, to mimic performance of the materials as part of a display device. Each material at the given thickness was disposed between the layer of glass and a pressure sensor, and the impact force was measure using a ball drop test. Each impact test was performed in triplicate, and the results were averaged to obtain the reported value. The results are reported as a percent reduction in the measured impact force ("reduction percent") by comparing the measured impact force for each material to a control drop that excluded the impact-absorbing material (i.e., glass and pressure sensor only).

Figure 4:
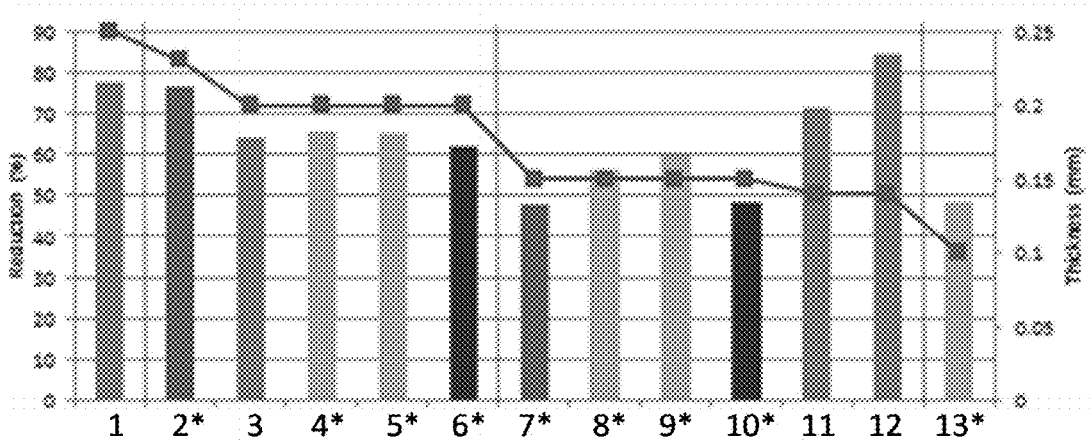
FIG. 4 shows the results of a ball drop impact test using a 10 gram steel ball dropped from a height of 10 centimeters onto various materials disposed on a glass layer.

In a first example, a 10 gram steel ball was dropped from a height of 10 centimeters. Nine different points were tested, with the ball drop repeated three times at each point. The results are shown in FIG. 4. Sample 1 having a thickness of 0.25 millimeters exhibited a force reduction of 70 to 80%. Sample 3, having a thickness of 0.2 millimeters, exhibited a force reduction of about 65%, which was observed to be comparable to the open-celled polyurethane foam (4* and 5*) and the closed-cell polyolefin foam obtained from Sekisui Chemical Co. (6*). Thinner nonwoven materials having a thickness of less than 0.15 millimeters prepared from the thermoplastic polyester elastomer (shown as 11 and 12) exhibited force reductions of 70 and 85%, respectively, outperforming each of the comparative materials tested at this thickness. Interestingly, it was also noted that the thermoplastic polyester elastomer nonwoven materials having the same overall thickness but comprising single row meltblown fibers or multi-row meltblown fibers exhibited different force reductions, with the multi-row meltblown nonwoven achieving a force reduction about 10% greater than the corresponding single row melt blown nonwoven.

Figure 5:
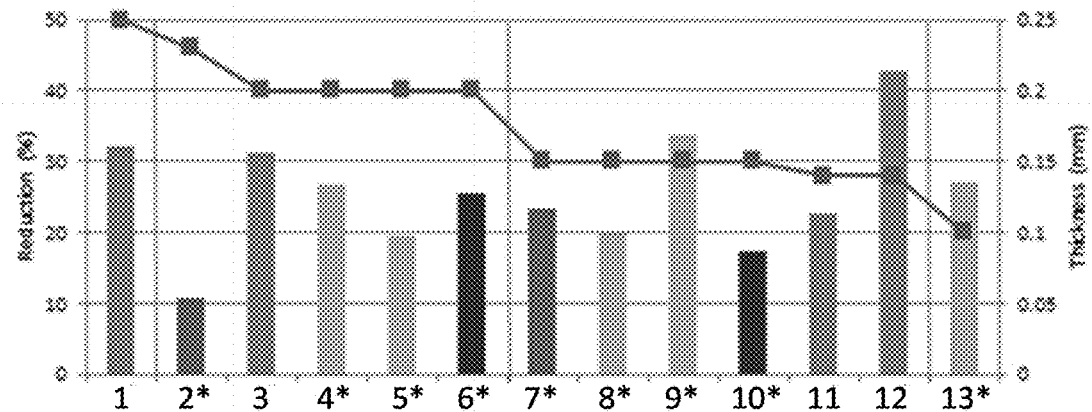
FIG. 5 shows the results of a ball drop impact test using a 30.6 gram steel ball dropped from a height of 20 centimeters onto various materials disposed on a glass layer.

The materials were further tested for impact performance at moderate force levels using a steel ball having a weight of 30.6 grams dropped from a height of 20 centimeters. As in the test described above, each of the materials at the given thickness were disposed between a layer of glass and a pressure sensor. The impact force reduction for each material measured according to this procedure is provided in FIG. 5. As shown in FIG. 5, the blends of the polyolefin elastomer and polypropylene (shown as 1 and 3) exhibited similar force reductions of about 30%, despite the difference in sample thickness (0.25 mm for sample 1, and 0.2 mm for sample 3). Sample 3 outperformed all other materials tested at a thickness of 0.2 (samples 2* and 4*-6*). For materials having a thickness of 0.15 mm, the single row meltblown thermoplastic polyester elastomer of sample 11 performed comparably to the foamed materials, exhibiting a force reduction 20-25%. Interesting, the multi-row meltblown thermoplastic polyester elastomer exhibited an increased force reduction of 40-45% at the same thickness.

The average fiber diameter of the polymer fibers of the nonwoven materials were further analyzed using SEM. Interestingly, it was found that single row meltblown fibers prepared from a blend of the polyolefin elastomer and polypropylene (3) and thermoplastic polyester elastomer (11) exhibited average diameters of 4 to 7 micrometers and 5 to 7 micrometers, respectively. It contrast, the multi-row melt blown fibers prepared from a blend of the polyolefin elastomer and polypropylene (1) and thermoplastic polyester elastomer (12) exhibited average diameters of 7 to 15 micrometers and 10 to 15 micrometers, respectively. Without wishing to be bound by theory, it is believed that the difference in the average fiber diameters when prepared by a single row or a multi-row meltblowing process can affect the impact properties of the resulting nonwoven material.

Figure 6:
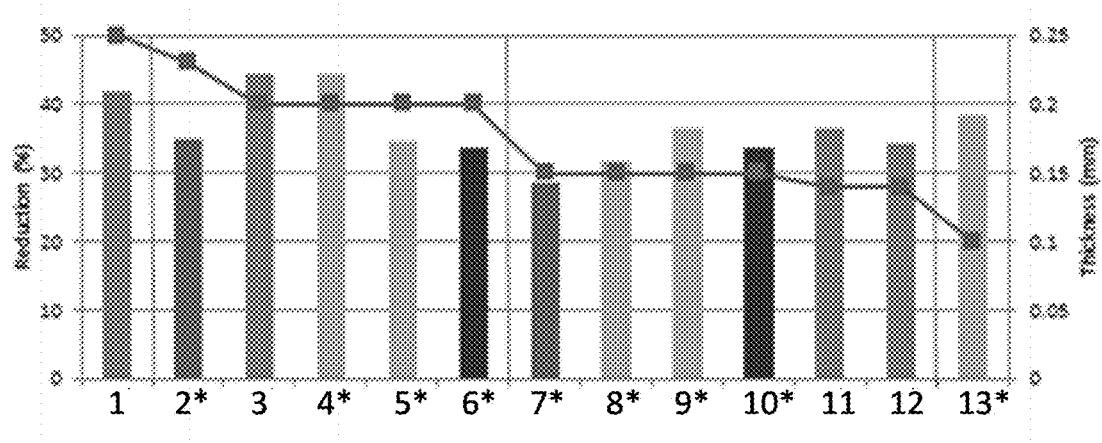
FIG. 6 shows the results of a ball drop impact test using a 55 gram steel ball dropped from a height of 20 centimeters onto various materials disposed on a glass layer.

The materials were also tested for impact performance with higher force using a steel ball having a weight of 55 grams dropped from a height of 20 centimeters. As in the test described above, each of the materials at the given thickness were disposed between a layer of glass and a pressure sensor. The impact force reduction for each material measured according to this procedure is provided in FIG. 6. As shown in FIG. 6, the nonwoven materials according to the present disclosure (1, 3, 11, and 12) each performed similar to the other materials within each thickness group.

The above-described compressibility and impact performance testing, and the data provided in FIG. 2-6 indicate that nonwoven materials comprising a plurality of polymer fibers can advantageously be used as compressible pressure pads and/or impact-absorbing pads, particularly for handheld electronic devices. In a particularly advantageous aspect, it has been shown that the nonwoven materials according to the present disclosure unexpectedly provide superior force reduction, particularly with materials having a thickness of 0.2 mm or less, or 0.15 mm or less.

The subassemblies, devices, and methods described herein are further illustrated by the following embodiments, which are non-limiting.

Embodiment 1: A subassembly for a display device, comprising a display component comprising an outer display surface and an opposite inner surface; a compressible pressure pad comprising a plurality of nonwoven fibers having an average diameter of 100 micrometers or less, disposed on the inner surface of the display component; and an internal component disposed on the compressible pressure pad on a side opposite the display component.

Embodiment 2: The subassembly of embodiment 1, wherein the plurality of nonwoven fibers comprise a thermoplastic polymer.

Embodiment 3: The subassembly of embodiment 2, wherein the thermoplastic polymer comprises a polyacetal, poly($C_{1-6}$ alkyl)acrylate, polyamide, polyamideimide, polyanhydride, polyarylate, polyarylene ether, polyarylene sulfide, polyarylsulfone, polybenzothiazole, polybenzoxazole, polybenzimidazole, polycarbonate, polyester, polyetheretherketone, polyetherimide, polyetherketoneketone, polyetherketone, polyethersulfone, polyimide, poly($C_{1-6}$ alkyl)methacrylate, polymethacrylamide, polyolefin, polyoxadiazole, polyphthalide, polysilazane, polysiloxane, polystyrene, polysulfide, polysulfonamide, polysulfonate, polysulfone, polythioester, polytriazine, polyurea, polyurethane, polyvinyl alcohol, polyvinyl ester, polyvinyl ether, polyvinyl halide, polyvinyl nitrile, polyvinyl ketone, polyvinylidene fluoride, or a combination comprising at least one of the foregoing thermoplastic polymers.

Embodiment 4: The subassembly of embodiment 2 or 3, wherein the thermoplastic polymer is a thermoplastic elastomer.

Embodiment 5: The subassembly of embodiment 4, wherein the thermoplastic polymer has a tensile elongation at break of greater than 100%, preferably greater than 150%, more preferably greater than 300%, measured according to ASTM D638; a resiliency of greater than 50%, preferably at least 60%, more preferably at least 65%, measured according to ASTM D4964; or a melt flow index effective to allow melt blowing of the thermoplastic polymer, preferably wherein the thermoplastic polymer has a melt flow index of greater than 5 grams per 10 minutes, measured according to ASTM D1238 or ISO 1133.

Embodiment 6: The subassembly of any one or more of embodiments 3 to 5, wherein the nonwoven fibers comprise a thermoplastic polymer or a combination of thermoplastic polymers effective to provide all the properties of embodiment 5.

Embodiment 7: The subassembly of any one or more of embodiments 4 to 6 wherein the thermoplastic elastomer comprises a hard segment comprising a polyester block and a soft segment comprising a polyether block.

Embodiment 8: The subassembly of embodiment 7, wherein the hard segment of the thermoplastic polyester elastomer comprises a poly(alkylene terephthalate), a poly(alkylene isophthalate), or a combination comprising at least one of the foregoing; and the soft segment of the thermoplastic polyester elastomer comprises a polyether comprising a polybutylene ether, a polypropylene ether, a polyethylene ether, or a combination comprising at least one of the foregoing, preferably, a polybutylene ether.

Embodiment 9: The subassembly of any one or more of embodiments 2 or 8, wherein the thermoplastic polymer comprises a polyolefin, preferably polypropylene.

Embodiment 10: The subassembly of any one or more of embodiments 1 to 10, wherein the plurality of nonwoven fibers further comprise a crosslinking agent.

Embodiment 11: The subassembly of any one or more of embodiments 1 to 10, wherein at least a portion of the plurality of fibers are crosslinked at a point of contact between the fibers.

Embodiment 12: The subassembly of embodiment 10 or 11, wherein the crosslinking occurs during or after fiber manufacture.

Embodiment 13: The subassembly of any one or more of claims 1 to 12, wherein the plurality of nonwoven fibers exclude glass.

Embodiment 14: The subassembly of any one or more of embodiments 1 to 13, wherein the compressible pressure pad has a thickness of 10 micrometers to 10 millimeters, or 50 micrometers to 5 millimeters, or 50 micrometers to 2 millimeters, or 50 micrometers to 1 millimeter, or 50 to 500 micrometers, or 50 to 250 micrometers.

Embodiment 15: The subassembly of any one or more of embodiments 1 to 13, wherein the compressible pressure pad has a thickness of 250 micrometers or less, or 10 micrometers to 200 micrometers, or 25 micrometers to 200 micrometers, or 50 to 200 micrometers.

Embodiment 16: The subassembly of any one or more of embodiments 1 to 15, wherein the plurality of fibers have an average diameter of 0.5 nanometers to less than 100 micrometers, or 0.5 nanometers to 80 micrometers, or 1 nanometers to 50 micrometers; 0.5 nm to 10 micrometers, or 10 nm to 8 micrometers, or 100 nm to 5 micrometers; or 250 nanometers to 5 micrometers, or 500 nanometers to 5 micrometers, or 750 nanometers to 5 micrometers, or 1 to 5 micrometers.

Embodiment 17: The subassembly of any one or more of embodiments 1 to 16, wherein the compressible pressure pad has an average distance between fibers of 0.05 nanometers to 50 millimeters, or 0.1 nanometers to 1 millimeter, or 1 nanometers to 500 micrometers.

Embodiment 18: The subassembly of any one or more of embodiments 1 to 17, wherein the compressible pressure pad has a weight of 1 to 100 grams per square meter, or 2.5 to 50 grams per square meter, or 5 to 30 grams per square meter.

Embodiment 19: The subassembly of any one or more of embodiments 1 to 18, wherein the compressible pressure pad excludes a foam.

Embodiment 20: The subassembly of any one or more of embodiments 1 to 19, further comprising a screen disposed on the outer surface of the display component.

Embodiment 21: The subassembly of embodiment 20, further comprising an adhesive layer disposed between the screen and the display component.

Embodiment 22: The subassembly of any one or more of embodiments 1 to 21, further comprising an adhesive layer disposed on one or both sides of the compressible pressure pad.

Embodiment 23: The subassembly of embodiments 21 or 22, wherein the adhesive layer comprises an optically clear adhesive.

Embodiment 24: The subassembly of any one or more of embodiments 1 to 23, wherein the display component is a liquid crystal display component.

Embodiment 25: The subassembly of any one or more of embodiments 1 to 24, wherein the display component is a light emitting diode display component, preferably an organic light emitting diode display component.

Embodiment 26: A display device comprising the subassembly of any one or more of embodiments 1 to 25, wherein the display device is a mobile electronic device.

Embodiment 27: The display device of embodiment 26, wherein the mobile electronic device is a cellular telephone, a smart telephone, a laptop computer, or a tablet computer.

Embodiment 28: A subassembly for a mobile electronic display device comprising a liquid crystal display component or a light emitting diode display component having an outer display surface and an opposite inner surface, a screen disposed on the outer display surface of the display component; a compressible pressure pad disposed adjacent the inner surface of the display component, wherein the compressible pressure pad comprises a plurality of nonwoven, thermoplastic fibers having an average diameter of 100 micrometers or less a thickness of 50 micrometers to 1 millimeter, has a weight of 5 to 30 grams per square meter, has a thickness of less than 200 micrometers, and is devoid of a foam; and an internal component disposed on the compressible pressure pad on a side opposite the display component.

Embodiment 29: A mobile electronic display device comprising the subassembly of embodiment 28, preferably wherein the mobile electronic display device is a cellular telephone, a smart telephone, a laptop computer, or a tablet computer.

Embodiment 30: A method for reducing ripple effect in a display device comprising a display component disposed on an internal component, the method comprising, incorporating a compressible pressure pad comprising a plurality of nonwoven fibers having an average diameter of 100 micrometers or less between the display component and the internal component.

Embodiment 31: A method for improving impact absorption in a display device comprising a display component disposed on an internal component, the method comprising, incorporating a compressible pressure pad comprising a plurality of nonwoven polymer fibers having an average diameter of 100 micrometers or less between the display component and the internal component; wherein the compressible pressure pad has a thickness of 200 micrometers or less, preferably 150 micrometers or less.

Embodiment 32: A nonwoven material comprising a plurality of nonwoven polymer fibers having an average diameter of 100 micrometers or less, and a thickness 250 micrometers or less, wherein the plurality of nonwoven polymer fibers comprise a thermoplastic elastomer having a tensile elongation of greater than 100%, measured according to ASTD D638; a resiliency of greater than 50%, preferably at least 60%, more preferably at least 65%, measured according to ASTM D4964; and a melt flow index of greater than 5 grams per 10 minutes, measured according to ASTM D1238 or ISO 1133; and the nonwoven material exhibits an impact force reduction of greater than or equal to 4%, preferably greater than or equal to 10%.

Embodiment 33: The nonwoven material of embodiment 32, wherein the nonwoven material disposed on a 1 millimeter thick glass surface exhibits at least one of an impact force reduction of at least 60%, preferably 60 to 95%, more preferably 65 to 90% compared to the glass surface not including the nonwoven material, determined by dropping a 10 gram steel ball from a height of 10 centimeters; an impact force reduction of at least 20%, preferably 20 to 50%, more preferably 25 to 45% compared to the glass surface not including the nonwoven material, determined by dropping a 30.6 gram steel ball from a height of 20 centimeters; and an impact force reduction of at least 30%, preferably 30 to 50% compared to the glass surface not including the nonwoven material, determined by dropping a 55 gram steel ball from a height of 20 centimeters.

Embodiment 34: The nonwoven material of embodiment 32 or 33, wherein the nonwoven material disposed on a glass surface, and wherein the nonwoven material exhibits an impact force reduction of at least 20%, preferably 20 to 50%, more preferably 25 to 45%, even more preferably 30 to 45% compared to the glass surface not including nonwoven material, determined by dropping a 30.6 gram steel ball from a height of 20 centimeters.

Embodiment 35: The nonwoven material of any one or more of embodiments 32 to 34, wherein the plurality of nonwoven polymer fibers comprise single row or multi-row meltblown polymer fibers.

Embodiment 36: The nonwoven material of claim 35, wherein the single row meltblown polymer fibers have an average diameter of 4 to 7 micrometers, preferably 5 to 7 micrometers, and the multi-row meltblown polymer fibers have an average diameter of 7 to 15 micrometers, preferably 10 to 15 micrometers.

Embodiment 37: The nonwoven material of any one or more of embodiments 32 to 36, wherein the plurality of nonwoven fibers are multi-row meltblown polymer fibers, and the nonwoven material exhibits at least one of: an impact force reduction of at least 70%, preferably 70 to 95%, more preferably 75 to 90% compared to the glass surface not including the nonwoven material, determined by dropping a 10 gram steel ball from a height of 10 centimeters; and an impact force reduction of at least 30%, preferably 30 to 50%, more preferably 30 to 45% compared to the glass surface not including the nonwoven material, determined by dropping a 30.6 gram steel ball from a height of 20 centimeters.

Embodiment 38: The nonwoven material of any one or more of embodiments 32 to 37, wherein the nonwoven material has a thickness of 150 micrometers or less, the plurality of nonwoven fibers are multi-row meltblown polymer fibers, and the nonwoven material exhibits at least one of: an impact force reduction of at least 80%, preferably 80 to 90% compared to the glass surface not including the nonwoven material, determined by dropping a 10 gram steel ball from a height of 10 centimeters; and an impact force reduction of at least 40%, preferably 40 to 50% compared to the glass surface not including the nonwoven material, determined by dropping a 30.6 gram steel ball from a height of 20 centimeters.

Embodiment 39: An article including the nonwoven material of any one or more of embodiments 32 to 38, wherein the article is a back pad for a hand-held electronic device, a foam tape, or a gasket.

In general, the subassemblies, display devices, and methods can alternatively comprise, consist of, or consist essentially of, any appropriate components herein disclosed. The subassemblies, display devices, and methods can additionally, or alternatively, be formulated so as to be devoid, or substantially free, of any components, materials, ingredients, adjuvants or species used in the prior art compositions or that are otherwise not necessary to the achievement of the function or objectives of the present invention.

All ranges disclosed herein are inclusive of the endpoints, and the endpoints are independently combinable with each other. "Combination" is inclusive of blends, mixtures, alloys, reaction products, and the like. "Or" means "and/or." The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. Reference throughout the specification to "another embodiment," "an embodiment," and so forth, means that a particular element described in connection with the embodiment is included in at least one embodiment described herein, and may or may not be present in other embodiments. "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs. In addition, it is to be understood that the described elements may be combined in any suitable manner in the various embodiments.

All cited patents, patent applications, and other references are incorporated herein by reference in their entirety, including priority U.S. Patent Application No. 62/200,887 filed Aug. 4, 2015 and priority U.S. Patent Application No. 62/245,505 filed Oct. 23, 2015. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A subassembly for a display device, comprising
   a display component comprising an outer display surface and an opposite inner surface;
   a compressible pressure pad comprising a plurality of nonwoven fibers having an average diameter of 100 micrometers or less, disposed on the inner surface of the display component; and
   an internal component disposed on the compressible pressure pad on a side opposite the display component, wherein the plurality of nonwoven fibers comprises a thermoplastic polymer comprising a thermoplastic elastomer; a polyolefin; or a combination comprising at least one of the foregoing;
   wherein the thermoplastic polymer has one or more of
      a tensile elongation at break of greater than 100%, measured according to ASTM D638;
      a resiliency of greater than 50%, measured according to ASTM D4964; or
      a melt flow index effective to allow melt blowing of the thermoplastic polymer; and
   wherein the compressible pressure pad disposed on a 1 millimeters thick glass surface exhibits at least one of:
      an impact force reduction of at least 60% compared to the glass surface not including the compressible pressure pad, determined by dropping a 10 gram steel ball from a height of 10 centimeters;
      an impact force reduction of at least 20% compared to the glass surface not including the compressible pressure pad, determined by dropping a 30.6 gram steel ball from a height of 20 centimeters; and
      an impact force reduction of at least 30% compared to the glass surface not including the compressible pressure pad, determined by dropping a 55 gram steel ball from a height of 20 centimeters.

2. The subassembly of claim 1, wherein the plurality of nonwoven fibers further comprise a crosslinking agent, and wherein at least a portion of the plurality of fibers are crosslinked at a point of contact between the fibers.

3. The subassembly of claim 1, wherein the compressible pressure pad has a thickness of
   10 micrometers to 10 millimeters; or
   250 micrometers or less.

4. The subassembly of claim 1, wherein the plurality of fibers have an average diameter of 0.5 nanometers to less than 100 micrometers;
0.5 nm to 10 micrometers; or
250 nanometers to 5 micrometers.

5. The subassembly of claim 1, wherein the compressible pressure pad has an average distance between fibers of 0.05 nanometers to 50 millimeters.

6. The subassembly of claim 1, wherein the compressible pressure pad has a weight of 1 to 100 grams per square meter.

7. The subassembly of claim 1, wherein the compressible pressure pad excludes a foam.

8. The subassembly of claim 1, further comprising a screen disposed on the outer surface of the display component, and optionally, an adhesive layer disposed between the screen and the display component.

9. The subassembly of claim 1, further comprising an adhesive layer disposed on one or both sides of the compressible pressure pad.

10. The subassembly of claim 9, wherein the adhesive layer comprises an optically clear adhesive.

11. The subassembly of claim 1, wherein the display component is a liquid crystal display component or a light emitting diode display component.

12. The subassembly of claim 1, wherein the subassembly is a subassembly for a mobile electronic display device comprising
 a liquid crystal display component or a light emitting diode display component having an outer display surface and an opposite inner surface,
 a screen disposed on the outer display surface of the display component;
 a compressible pressure pad disposed adjacent the inner surface of the display component, wherein the compressible pressure pad comprises a plurality of nonwoven, thermoplastic fibers having an average diameter of 100 micrometers or less, a thickness of 50 micrometers to 1 millimeter, has a weight of 5 to 30 grams per square meter, and is devoid of a foam; and
 an internal component disposed on the compressible pressure pad on a side opposite the display component.

13. A display device comprising the subassembly of claim 1, wherein the display device is a mobile electronic device.

14. A method for reducing ripple effect or improving impact absorption in a display device comprising a display component disposed on an internal component, the method comprising,
 incorporating a compressible pressure pad comprising a plurality of nonwoven fibers having an average diameter of 100 micrometers or less between the display component and the internal component, wherein
 the plurality of nonwoven polymer fibers comprise a thermoplastic polymer comprising a thermoplastic elastomer; a polyolefin; or a combination comprising at least one of the foregoing, wherein the thermoplastic polymer has one or more of:
  a tensile elongation of greater than 100%, measured according to ASTM D638;
  a resiliency of greater than 50, measured according to ASTM D4964; and
  a melt flow index effective to allow melt blowing of the thermoplastic polymer; and
 wherein the compressible pressure pad disposed on a 1 millimeter thick glass surface exhibits at least one of:
 an impact force reduction of at least 60% compared to the glass surface not including the nonwoven material, determined by dropping a 10 gram steel ball from a height of 10 centimeters;
 an impact force reduction of at least 20% compared to the glass surface not including the nonwoven material, determined by dropping a 30.6 gram steel ball from a height of 20 centimeters; and
 an impact force reduction of at least 30% compared to the glass surface not including the nonwoven material, determined by dropping a 55 gram steel ball from a height of 20 centimeters.

15. A nonwoven material comprising a plurality of nonwoven polymer fibers having an average diameter of 100 micrometers or less, and a thickness 250 micrometers or less, wherein
 the plurality of nonwoven polymer fibers comprise a thermoplastic elastomer having
  a tensile elongation of greater than 100%, measured according to ASTM D638;
  a resiliency of greater than 50%, measured according to ASTM D4964; and
  a melt flow index of greater than 5 grams per 10 minutes, measured according to ASTM D1238 or ISO 1133 ; and
 wherein the nonwoven material disposed on a 1 millimeter thick glass surface exhibits at least one of:
 an impact force reduction of at least 60% compared to the glass surface not including the nonwoven material, determined by dropping a 10 gram steel ball from a height of 10 centimeters;
 an impact force reduction of at least 20% compared to the glass surface not including the nonwoven material, determined by dropping a 30.6 gram steel ball from a height of 20 centimeters; and
 an impact force reduction of at least 30% compared to the glass surface not including the nonwoven material, determined by dropping a 55 gram steel ball from a height of 20 centimeters.

16. The nonwoven material of claim 15, wherein the plurality of nonwoven polymer fibers comprise single row or multi-row meltblown polymer fibers.

17. The nonwoven material of claim 15, wherein the plurality of nonwoven fibers are multi-row meltblown polymer fibers, and the nonwoven material exhibits at least one of:
 an impact force reduction of at least 70% compared to the glass surface not including the nonwoven material, determined by dropping a 10 gram steel ball from a height of 10 centimeters; and
 an impact force reduction of at least 30% compared to the glass surface not including the nonwoven material, determined by dropping a 30.6 gram steel ball from a height of 20 centimeters.

* * * * *